United States Patent

Kranyik et al.

[15] 3,696,524
[45] Oct. 10, 1972

[54] TEACHING MACHINE

[72] Inventors: Robert Donald Kranyik, Weston; Donald E. Vegliante, North Haven; Donald F. Balmer, Madison, all of Conn.

[73] Assignee: Learning Systems Corporation, Hamden, Conn.

[22] Filed: Sept. 8, 1970

[21] Appl. No.: 70,210

[52] U.S. Cl. ..................................................35/9 C
[51] Int. Cl. ................................................G09b 7/08
[58] Field of Search........35/9 A, 9 B, 9 C, 8 A, 48 B, 35/9 R

[56] References Cited

UNITED STATES PATENTS

| | | | |
|---|---|---|---|
| 3,487,558 | 1/1970 | Golden et al. | 35/9 C |
| 3,141,244 | 7/1964 | Smith | 35/9 C |
| 3,057,082 | 10/1962 | Wellington et al. | 35/9 C |
| 2,860,422 | 11/1958 | May | 35/9 C |
| 319,224 | 6/1885 | Gates | 35/9 C |
| 1,997,178 | 4/1935 | Johnson | 35/48 B |
| 3,141,243 | 7/1964 | Chapman et al. | 35/9 A |

*Primary Examiner*—Wm. H. Grieb
*Attorney*—Fishman and Van Kirk

[57] ABSTRACT

A teaching machine which utilizes both oral and graphic information to test a student's ability. Graphic representation on an activity sheet mounted to an activity board are identified by a student in response to questions posed to the student through a tape recorder. The student responds to the questions by inserting a probe through the activity sheet into the activity board which produces a response commensurate with the correctness of the answer given by the student. Both remedial response in the event of a wrong answer and reinforcing response in the case of a correct answer may be provided.

16 Claims, 3 Drawing Figures

PATENTED OCT 10 1972  3,696,524

INVENTORS
ROBERT D. KRANYIK
DONALD E. VEGLIANTE
BY  DONALD BALMER

FISHMAN & VAN KIRK
ATTORNEYS

TEACHING MACHINE

BACKGROUND OF THE INVENTION

1. Field of the Invention

This invention relates to the field of teaching machines and is more particularly directed to teaching machines which utilize both visual and oral information to stimulate the student's learning ability.

2. Description of the Prior Art

Prior art in the field of teaching machines is quite extensive and includes devices which provide both visual and oral stimuli for the student. Such devices, as shown for example in U.S. Pats. Nos. 3,141,243 and 3,487,558, have both visual and oral features for interrogating a student and presenting a response addressed to the particular answer provided by a student.

Oral reinforcement if a student elects a correct answer is important in the learning process, particularly for younger children of the preschool or primary school ages. An oral reward for or reinforcement of a correct answer stimulates the child's confidence, strengthens the correct response pattern, and encourages him to proceed to more difficult questions. Remedial instructions are also advantageous for the child in cases where he elects the wrong answer. With such remedial instructions, the child recognizes the fact that the wrong answer was given and also may learn the correct answer to add to his store of knowledge.

While the prior art devices such as those references above provide both reinforcement and remedial instructions, such devices are relatively expensive due to the sophisticated equipment employed to accomplish the various functions. In addition, because of the special nature of the visual medium and the sound reproducing apparatus, it is not possible to vary the instructional program without purchasing prepared visual and oral programs. The teacher who has direct contact with the child is therefore limited to subject matter which is either specially prepared at increased cost or available from a limited commercial market. It is not possible for the teacher alone to prepare a course of instructions particularly addressed to a specific subject or specially oriented to a given student.

SUMMARY OF THE INVENTION

The teaching machine of the present invention is composed basically of a recorded sound producer, such as a magnetic tape recorder, which is controlled by an activity board in accordance with student responses indicated on the board.

The activity board includes a plurality of apertures distributed in groups over its surface. An activity sheet bearing graphic information is overlaid on the board so that apertures in the sheet register with selected apertures in the board. The apertures in the activity sheet are associated with answers which the student may elect and are uniquely matched with the board apertures according to an established code. Each group of board apertures contains one or more apertures which have electrical contacts hidden behind the board. The contacts serve as switches to control the tape recorder coupled to the board through circuitry which establishes the code. A student actuates the audio playback system by inserting a probe through the apertures in the activity sheet into the board to close the contacts and complete an appropriate electrical circuit with the tape recorder.

In one embodiment of the invention, all of the apertures are connected to different tape recorders or different tracks of the same tape recorder so that either reinforcing or remedial information is reproduced depending upon which answer the student elects. Although the coding between the activity board and the tape recorder is established by the prewired and usually permanent electrical circuitry, the coding as it appears to the student can be changed since several apertures in each group are wired in parallel for correct answers. By shifting the position of the correct sheet aperture from activity sheet to activity sheet so that the position of the correct aperture does not consistently fall at the same location, the student will not readily recognize the established coding of the machine.

The recorder permits a teacher to program a blank tape with desired subject matter. Correspondingly, the activity sheets may be blank forms for insertion of graphic information as the teacher desires.

It is an object of the present invention to disclose a visual and oral teaching device which stimulates a student's learning ability and adds to his store of knowledge.

It is a further object of the present invention to disclose a teaching machine which is inexpensive and yet provides both visual and oral stimuli for the student.

It is a further object of the present invention to disclose a teaching machine which is simple in construction and which may be programmed by the teacher having direct contact with the student who will use the teaching machine.

It is a further object of the present invention to disclose a teaching machine which employs expendable activity sheets in conjunction with oral instructional matter.

BRIEF DESCRIPTION OF THE DRAWINGS

The teaching machine of the present invention together with its numerous objects and advantages will be better understood by reference to the following drawings in which the same elements bear the same reference numerals through the several figures.

DESCRIPTION OF THE PREFERRED EMBODIMENTS

Figure 1:
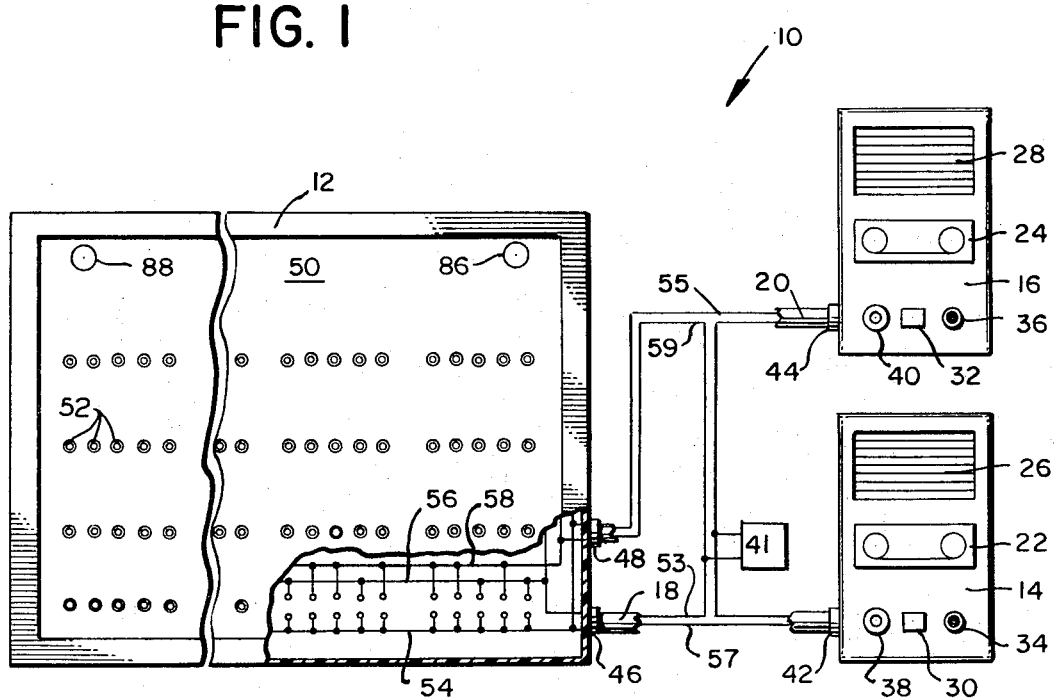
FIG. 1 shows the activity board, partly in section, and tape recorders which comprise one embodiment of the invention.

With reference now to FIG. 1, a preferred embodiment of a novel teaching machine, generally designated by the numeral 10, in accordance with the present invention is disclosed. The principal components of this embodiment include an activity board 12, tape recorders 14 and 16 and interconnecting cables 18 and 20 between the two recorders and the activity board 12.

The tape recorders 14 and 16 are identical. The recorders are a type which have both recording and playback features. Tape cassettes 22 and 24 are inserted in the recorders as necessary. Information can be recorded on the tape within the cassettes and played back through the integral audio speakers 26 or 28. Such tape recorders are well known in the art and are commercially available in a portable form. While a portable tape recorder may be advantageously utilized in the present invention so that the teaching machine can be moved easily from one location to another, the invention is not so limited and it is contemplated that the teaching machine may be connected to a more permanently situated recording and playback apparatus. Recording is accomplished by turning the recorders on by means of respective switches 30 and 32 and connecting a microphone to an input jack 34 or 36. Controls 38 and 40 are used for playback of the recorded message in the tape cassettes 22 and 24 through the speakers 26 or 28.

The actual transport of the tapes in cassettes 22 and 24 across the playback heads of the recorders 14 and 16 is controlled through cables 18 and 20 and the board 12. Such control can be accomplished by interrupting power to the tape transport mechanism alone or by interrupting all power to the tape recorder. In the former arrangement, cable 18 and the board 12 may be used to complete or interrupt a circuit to a relay which transmits power to the tape drive mechanism. In the latter situation, which is depicted in FIG. 1, the cable and board may interrupt low voltage d.c. power circuits between the tape recorders 14 or 16 and a converter 41 or other suitable low voltage source which supplies power to the tape recorders. In either event, the cables 18 and 20 have respective connectors 42 and 44 with the tape recorders 14 and 16 and connectors 46 and 48 with the activity board 12. As is described in greater detail below, the activity board 12 possesses electrical circuitry which, when appropriately actuated by the student, completes the electrical circuit to the tape recorder and causes the recorder to reproduce the information recorded in the tape cassettes.

With a general understanding that the cables and activity board 12 are employed to actuate one or the other of the tape recorders 14 or 16, it is appropriate to examine the construction of the activity board 12 shown in detail in FIG. 1. The board 12 in one embodiment of the invention is constructed of a non-conductive plastic material and has a shallow rectangular box construction. The exposed surface 50 of the board 12, corresponding to the bottom of the shallow box, has an array of apertures 52 distributed across the board 12 in lineal groups. Each of the lineal groups is composed of five apertures in the embodiment shown; however, it should be understood that the number of apertures may be varied with no less than four being preferred. As can be seen from the cut away portion at the lower right hand corner of the board 12, parallel electrical circuits extend from the connectors 46 or 48 to contacts mounted behind the board 12 opposite surface 50. One pair of contacts registers with each of the apertures 52.

The board circuitry includes busses 54, 56 and 58. Bus 54 has a common connection to conductors 53 and 55 in the cables 18 and 20 through the connectors 46 and 48. Bus 56, however, leads through connector 46 to conductor 57 in cable 18 while bus 58 leads to the conductor 59 in cable 20 through connector 48. With this construction, each of the paired contacts in registry with an aperture may complete an electrical circuit in one of the cables 18 or 20 to a tape recorder since one of the contacts is connected to the common bus 54 and the other of the contacts is connected to either bus 56 or bus 58.

While the contacts and wiring are shown for only a portion of the activity board 12, it will be understood that pairs of contacts connected in parallel circuits with either one of the cables 18 and 20 are hidden behind the board 12 in registry with all of the apertures 52. Each lineal group of apertures has pairs of contacts connected to both of the cables 18 and 20 and therefore to both of the tape recorders 14 and 16. Completing the electrical circuit across the pair of contacts energizes the associated tape recorder.

Figure 2:
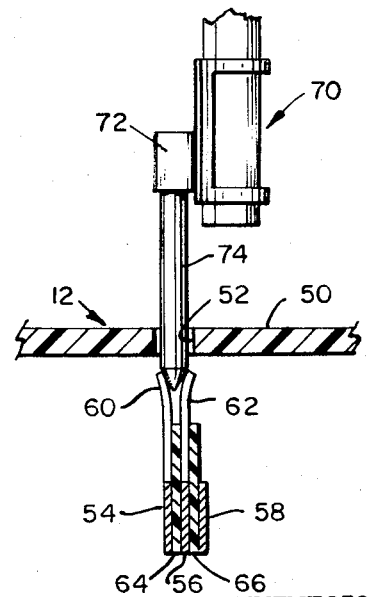
FIG. 2 shows the details of the probe employed by the student and the electrical contacts incorporated within the activity board.

The detailed construction and operation of the contacts registering with an aperture 52 are shown more clearly in FIG. 2. The bus 54 may be so constructed that the contacts are formed as integral leaf springs 60 projecting to a position immediately adjacent an aperture 52. Correspondingly, the bus 56 may have integral leaf springs 62 projecting to a point immediately adjacent the aperture 52. In order to insulate the two leaf springs and busses from one another, a strip of insulation 64 is sandwiched between the two busses and the leaf springs. The bus 58 may also be included in the laminated structure separated from the bus 56 by means of a strip of insulation 66. Again the bus 58 may include integral leaf springs in the same manner as the busses 54 and 56. Of course, it will be understood that the leaf spring contacts from busses 56 and 58 will be located at different apertures so that the circuit to only one of the cables 18 or 20 can be completed at any given aperture. The laminated bus construction is supported from the board 12 by support posts (not shown).

As seen in FIG. 2, a probe 70 is employed to complete the circuit between the leaf spring contacts at any given aperture. The probe 70 is composed of a cylindrical clamping sleeve 72 and a pointed end member 74. The sleeve 72 is sized to fit over an ordinary lead pencil in clamping relationship with the pencil. With the probe 70 mounted to a pencil by means of the sleeve, a student can manipulate the probe as if it were simply a pencil. The end member 74 is sized to fit into aperture 52 so that it contacts both of the leaf spring contacts 60 and 62. The member 74 is formed from a conductive material and may be electrically insulated from sleeve 72 by an intervening insulator if desired. When inserted into aperture 52 against the contacts 60 and 62, the conductive probe 70 completes an electrical circuit between busses 54 and 56. If the contact 62 were instead connected to bus bar 58, the electrical circuit between bus bars 54 and 58 would be completed. In the former case cable 18 in FIG. 1 would actuate tape recorder 14. In the latter case, cable 20 would actuate recorder 16. It will therefore be understood that insertion of the probe 70 in any one of the apertures 52 will cause one of the recorders to operate.

Figure 3:
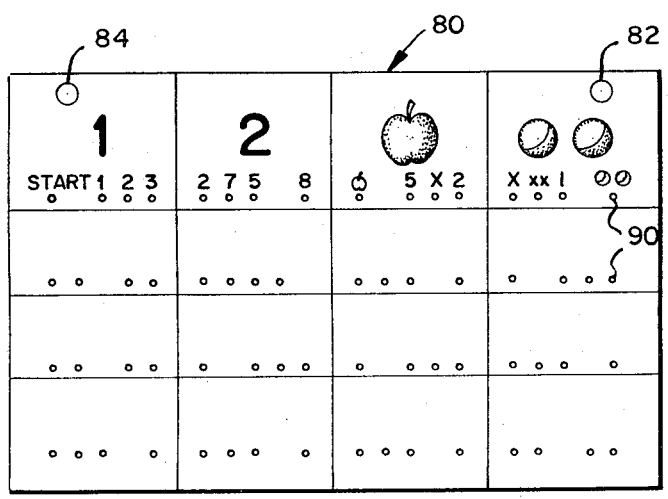
FIG. 3 shows an activity sheet which is overlaid on the activity board while a student is using the teaching machine.

FIG. 3 discloses the activity sheet 80 which is to be mounted on the activity board 12 in FIG. 1 in operation of the teaching machine 10. The activity sheet 80 may be formed from any suitable material including paper, cardboard or more permanent sheet material on which graphic information can be printed or drawn as shown. At the upper portion of the sheet 80, two alignment apertures 82 and 84 are provided and register with mating alignment pins 86 and 88 respectively projecting upwardly from the surface 50 of activity board 12 in FIG. 1. The sheet 80 also includes a plurality of apertures 90 distributed in lineal groups across the sheet 80. The apertures 90 have a positional relationship with apertures 82 and 84 which is identical with the relationship between alignment pins 86 and 88 and apertures 52 on board 12. As a consequence, when the activity sheet 80 is mounted on the surface 50 of board 12, a sheet aperture 90 will register with a board aperture 52. It will be noted that although the grouping of apertures on the sheet 80 and on the board 12 correspond positionally with one another, there is not a one-to-one correspondence between the apertures 90 and the apertures 52. In other words, while the groups of board apertures 52 are shown as containing five apertures, the groups of sheet apertures 90 may include only three or four apertures. Furthermore, the sheet apertures which do register with board apertures 52 do not correspond from group to group. The purpose of the varying distribution of the sheet apertures 90 is better explained in conjunction with the operation of the machine 10.

In operation, the activity sheet 80 is placed on the activity board 12 with the apertures 82 and 84 mounted over the aligning pins 86 and 88. The sheet apertures 90, where they exist, are then aligned with selected board apertures 52. The probe 70 (FIG. 2) is then inserted into the sheet aperture labelled START in the upper left hand frame of activity sheet 80 as seen in FIG. 3. The corresponding board aperture registers with contacts which lead to cable 18 to initiate operation of recorder 14. The recorded message in cassette 22 may then begin with instructional information identifying the graphic character in the first frame such as the number "1." After identification of the character, the message directs the student to remove the probe 70 and insert the probe into the aperture within the frame which is identified by a number "1." If the student successfully responds to the message by inserting the probe 70 into the correct aperture, contacts below that aperture again complete the circuit through cable 18 to recorder 14 and the recorded message provides reinforcing statements such as "Very good. You have found the number '1'." The reinforcing message is followed by instructions directing the student's attention to the subsequent frame where a similar instructional message and question are presented.

If the student fails to select the correct aperture in the first frame, for example, if he selects the aperture having the number "2" or "3" appearing above it, the contacts registering with either of these apertures will complete a circuit through cable 20 and energize recorder 16. The message recorded in cassette 24 is a remedial message which may state in general terms that the answer is not correct and another selection should be made. For example, the message may be "You have not found the answer but you may try again." The student trys again and a similar stereotype answer is repeated from the cassette 24 until the correct aperture is selected at which time recorder 14 is again actuated to advance the student to the next frame.

In a simplified embodiment of the invention only one recorder, that is recorder 14 by itself, is employed. The single recorder 14 will not advance unless the probe 70 is placed in the correct hole. No remedial message is given. This simplified embodiment is also educationally sound since the fact that the recorder does not advance informs the student that he has not selected the correct answer. The advancement, upon selection of the correct answer, serves as a reward in itself.

From this brief description of the operation, it will be understood that there is a coded relationship which must exist between the apertures 90 on the activity sheet and the board apertures 52 registering with contacts in one or the other of the electrical circuits through cables 18 and 20. In particular, the apertures 90 bearing the correct graphic answer must be correlated with board apertures having contacts connected to busses 54 and 56 so that the circuit is completed through cable 18 to recorder 14. Correspondingly, the apertures bearing graphic information which constitutes an incorrect answer must be associated with board apertures 52 adjacent contacts connected to busses 54 and 58 so that the circuit is completed through cable 20 to actuate recorder 16. There is, therefore, a unique relationship or coding which exists between the activity sheet 80 and the wiring of activity board 12.

In order to prevent a student from memorizing which aperture provides the correct answer in each frame, the various groups of apertures in board 12 include more than one aperture registering with contacts connected to bus 56, as seen by the arrangement of contacts board circuitry and exposed in FIG. 1. While the positional relationship of the "correct" apertures which connect to either bus 56 can be varied from group to group as shown in the exposed circuitry, it is possible to have a standard position of the "correct" apertures in each group. In either case, the variation in position of the answer on the activity sheet 80 is possible. If there are several "correct" apertures in each group, the position of the correct answer on the sheet can be varied from frame to frame or sheet to sheet by hiding all but one of the "correct" apertures in a group covered by a frame and shifting the position of the answer between the various positions available.

In view of the ability to vary the position of the answer within any one of the frames, it appears to the student that the correct answer shifts positions from frame to frame and sheet to sheet in a random fashion. The student, therefore, can not memorize the correct positional relationship of the various apertures and therefore cannot learn the coding of the board 12.

From the above description of the novel teaching machine 10, there are several significant features which should be noted.

In view of the ability to shift the positioning of the answer between several different positions in any given group or frame of the activity sheet, it is possible to vary the apparent "key" to the answers without rewiring the activity board 12. In many of the prior art devices employing a perforated board, a fixed association of apertures and answers is provided. A student may readily learn the association and thereby defeat the essential purpose of the teaching machine 10.

In contrast to many of the prior art machines, a teacher having direct contact with a student may obtain or make blank activity sheets 80 and draw or print graphic information on the blank sheets according to her needs. For example, the teacher may wish to test a student on a particular subject for which activity sheets are not available. In such cases, the teacher may prepare an activity sheet from a blank sheet with the aid of a coded overlay sheet which has graphic indicia revealing the code for all of the apertures in board 12. The blank sheet may be pre-cut with punch-out portions filling all of the apertures on the sheet. The teacher simply superimposes the sheets and removes the punch-out portions in selected holes of each frame on the blank sheet according to the code revealed on the overlay sheet. Questions corresponding to the graphic information applied to the blank sheet by the teacher can be recorded on a blank tape cassette. No special apparatus is needed to prepare either the graphic or oral material. The ability to program individual lessons is especially advantageous when dealing with exceptional children.

The activity sheet 80 can also be produced in relatively large numbers at very little expense. In view of the ease with which the activity sheets 80 can be produced, the sheets may be treated as expendable items. With expendable sheets, the student may additionally mark the sheet with crayon or pencil and the sheet can be destroyed after the teacher has had an opportunity to examine his responses.

It will therefore be seen that the novel teaching machine possesses many of the features of the prior art machines. In contrast to the prior art devices, the teaching machine may be assembled from components which are relatively inexpensive to manufacture or components which are readily available in the commercial market. The flexibility of the machine and the comparatively low cost of the components allows the machine to be adapted to a multitude of uses in schools or other training institutions.

While the teaching machine 10 has been described in a preferred embodiment, it should be understood that various modifications and substitutions can be made without departing from the spirit of the invention. For example, while the contact structure disclosed in FIG. 2 requires a conductive end member 74 on probe 70, it is equally feasible that a microswitch or other switch arrangement may be actuated by a nonconductive probe. While the machine is disclosed as employing two tape recorders individually actuated through cables 18 and 20, it is feasible to employ a single recorder which has a multitrack tape. In such cases, the cables 18 and 20 with the associated contacts in board 12 actuate different playback heads in the same tape recorder to produce either the remedial or reinforcing instruction. Since the recorders 14 and 16 are standard items available commercially, it is possible that a school will already have such recorders on hand and, therefore, the initial cost of the device will be greatly reduced. The recorders, if purchased new as part of the system, may, of course, be used for other purposes. The materials and construction which form the activity board 12 of course can be varied without interfering with the essential purpose of the board 12. Accordingly, the novel teaching machine in its preferred embodiment has been described by way of illustration rather than limitation.

What is claimed is:

1. A teaching machine comprising:

recorded sound producing means, said sound producing means including first and second selectively operable sound reproducing transducers;

an activity board having an exposed surface defining a plurality of groups of apertures distributed over the board;

a probe having an end fitted to the apertures of the activity board; and control means connected between the activity board and the sound reproducing means for controlling the operation of said sound reproducing means, the control means including first actuating means having elements registering with given apertures in each group, the control means further including second actuating means having elements registering with selected apertures in each group other than the given apertures, said first actuating means being responsive through its associated elements to the end of the probe at any one of the given apertures for actuating the first sound reproducing transducer and said second actuating means being responsive through its associated elements to the end of the probe at selected apertures in each group for actuating said second sound reproducing transducer.

2. The teaching machine of claim 1 wherein:

the first and second sound reproducing transducers are magnetic tape heads.

3. The teaching machine of claim 1 wherein:

the reproducing means includes first and second tape players, the first player including the first transducer and the second player including the second transducer.

4. The teaching machine of claim 1 wherein:

the control means is an electrical control means and the actuating means each include a plurality of parallel circuits.

5. The teaching machine of claim 4 wherein:

said actuating means circuits include electrical contacts connected in the plurality of parallel circuits and positioned adjacent the surface of the activity board disposed opposite to the exposed surface.

6. The teaching machine of claim 5 wherein:

the contacts are paired at each given aperture, each pair being spaced and electrically isolated; and the end of the probe fitted to the apertures is electrically conductive and fills the space between the paired contacts when fitted in an activity board aperture.

7. The teaching machine of claim 1 wherein:

an activity sheet is included, the activity sheet being sized to overlay the groups of apertures on the activity board and having groups of apertures through the sheet registering with prescribed board apertures, the prescribed board apertures including one of the given apertures in each group.

8. The teaching machine of claim 7 wherein:

the activity sheet further includes graphic information associated respectively with each group of sheet apertures and additional graphic information associated respectively with each sheet aperture, the additional information associated with the sheet apertures registering with the given board apertures being uniquely associated with the graphic information associated with the corresponding group.

9. The teaching machine of claim 8 wherein:
the sound reproducing means includes a recorded sound carrier, the recorded sounds on the carrier being uniquely associated with the graphic information in each group of sheet apertures.

10. The teaching machine of claim 7 wherein:
the activity board includes alignment elements having a known positional relationship with the board apertures; and
the activity sheet bears a corresponding alignment feature having a known positional relationship with the sheet apertures and mating with the alignment element of the activity board, the positional relationship of the alignment features corresponding to the positional relationship of the alignment elements to register the sheet apertures with the preselected apertures of the board.

11. The teaching machine of claim 7 wherein:
the activity sheet is an expendable activity sheet.

12. The teaching machine of claim 7 wherein:
the prescribed board apertures include only one of the given apertures in each group and a plurality of the selected apertures in each group.

13. Means for programming apparatus employed for instructional purposes, said instructional apparatus including a flat surface having a plurality of groups of apertures therein and instructional reinforcement means energized in response to the insertion of a probe in a plurality of given apertures of each group less than the total number of apertures in each group, said programming means comprising:
a program sheet, said program sheet bearing indicia on at least one surface for subdividing the sheet into discrete regions commensurate with groups of apertures in the surface of the instructional apparatus, said program sheet further including within each region a linearly aligned group of apertures having a coded relationship to the instructional apparatus apertures, each of said program sheet groups consisting of a plurality of apertures which are less in number than the apertures in the corresponding group in the instructional apparatus, with only one of said sheet apertures in each region corresponding to one of the given apertures in each group, said program sheet additionally having means thereon for facilitating positioning thereof on said instructional apparatus flat surface with the apertures in each sheet region in registration with apertures in a corresponding instructional apparatus surface group.

14. The apparatus of claim 13 wherein said means for facilitating positioning of the program sheet includes alignment apertures located near adjacent corners of the sheet.

15. The apparatus of claim 14 wherein at least some of said program sheet regions bear graphic information.

16. A programmable teaching apparatus comprising:
an activity board having an exposed flat surface defining a plurality of groups of apertures distributed over the board;
a first plurality of normally open electrical circuits, said circuits being connected in parallel and having contacts positioned adjacent to at least two apertures of each of said groups;
probe means having an end fitted to the apertures of the activity board, the insertion of said probe means into the apertures having said normally open electrical circuits associated therewith causing the closing of said circuits;
sound reproducing means positioned remotely of said activity board, said sound reproducing means including prerecorded instructional information and being energized in response to the closing of any one of said first plurality of electrical circuits; and
a program sheet overlay for said activity board, said program sheet bearing indicia on its surface for subdividing the sheet into distinctive regions commensurate with each group of apertures in said activity board, said program sheet including within each region only one aperture in registration with an activity board aperture having one of said electrical circuits associated therewith, said program sheet further including within each region a plurality of additional apertures in registration with activity board apertures which are not associated with said first plurality of electrical circuits, the total number of apertures in each region of said program sheet being less than the number of apertures in the corresponding group in the activity board.

* * * * *